United States Patent [19]
Brunet

[11] Patent Number: 5,307,550
[45] Date of Patent: May 3, 1994

[54] APPARATUS FOR REPAIRING LOWER UNITS

[76] Inventor: Normand A. Brunet, 108 Aleta Dr., Belleair Beach, Fla. 34635

[21] Appl. No.: 73,191

[22] Filed: Jun. 7, 1993

[51] Int. Cl.⁵ .............................................. B25B 27/14
[52] U.S. Cl. .................................. 29/272; 29/402.08; 29/402.13; 228/49.3; 408/222
[58] Field of Search ........... 29/402.08, 402.09, 402.11, 29/402.13, 402.17, 888.011, 271, 272; 228/44.5, 49.3; 408/222, 215

[56] References Cited

U.S. PATENT DOCUMENTS

| Re. 28,190 | 10/1974 | LaForce et al. | 228/44.5 |
| 2,343,632 | 3/1944 | Bakewell | 408/222 |
| 2,409,865 | 10/1946 | Jewell | 29/272 |
| 3,864,806 | 2/1975 | Hanson et al. | 29/402.17 |
| 5,044,083 | 9/1991 | DeCarolis et al. | 30/510 |
| 5,090,608 | 2/1992 | Jones | 228/49.3 |
| 5,197,832 | 3/1993 | Porter, Jr. | 408/222 |

Primary Examiner—Mark Rosenbaum
Assistant Examiner—David P. Bryant
Attorney, Agent, or Firm—Joseph C. Mason, Jr.; Ronald E. Smith

[57] ABSTRACT

Worn screw threads in the lower unit of a motorboat are repaired by cutting off the trailing end of a housing that is formed integral with the lower unit. The cut off part has the worn screw threads formed in it. A replacement part having pre-formed screw threads is welded into place to replace the cut off part, and a screw thread-cutting tool is used to clean and remove warpage from the screw threads in the replacement part after the welding is completed. An alignment tool holds the replacement part during the welding procedure.

3 Claims, 4 Drawing Sheets

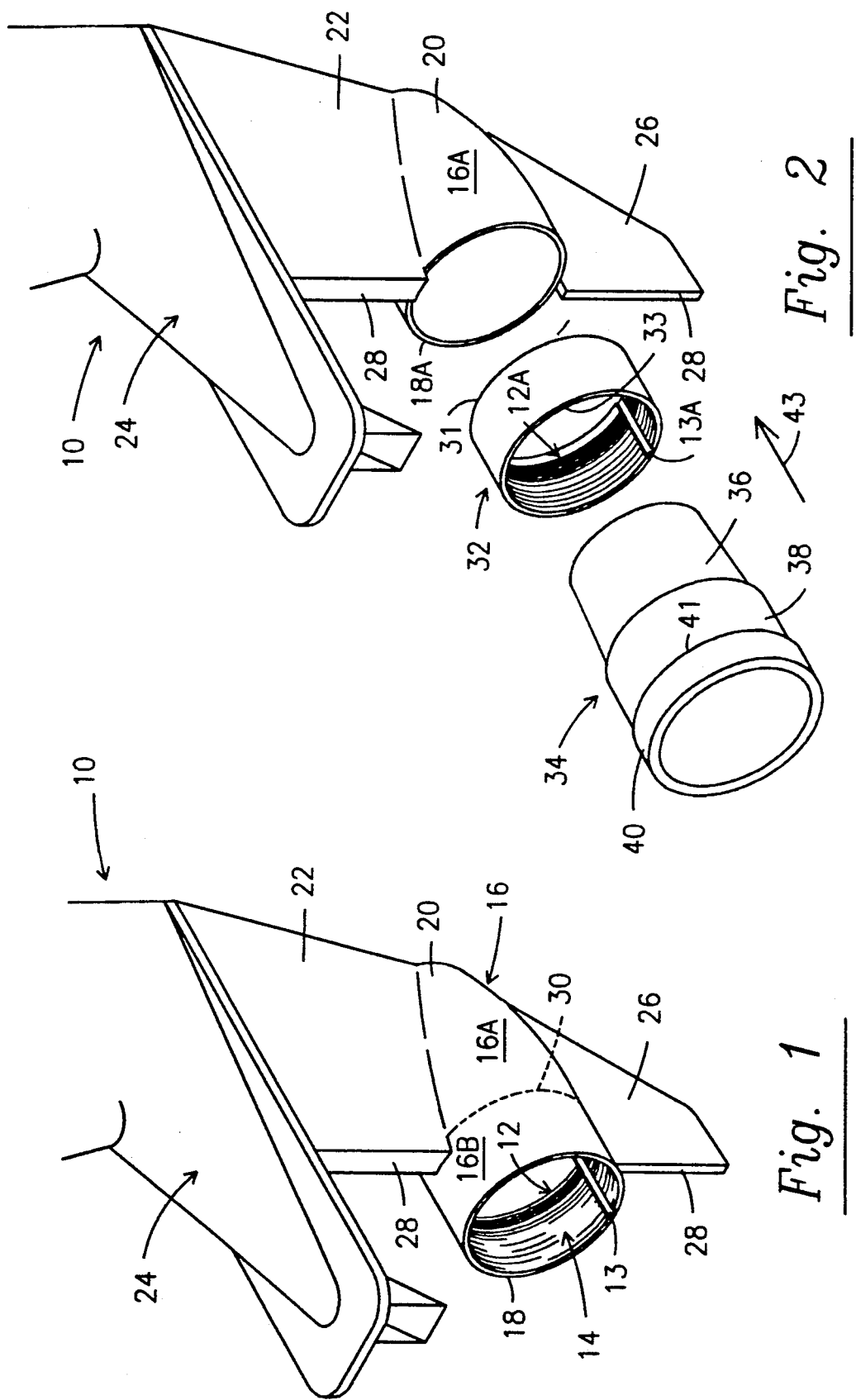

APPARATUS FOR REPAIRING LOWER UNITS

BACKGROUND OF THE INVENTION

1. Field of the Invention

This invention relates, generally, to techniques for the repair of the lower units of inboard or outboard motors. More particularly, it relates to a repair method that eliminates the practice of discarding lower units having worn screw threads.

2. Description of the Prior Art

Motorboat lower units are large, monolithic structures that depend downwardly from the hull of a boat at the trailing end thereof. More specifically, a lower unit includes a vertical strut that depends from an upper part of the lower unit, and a generally cylindrical housing is formed integrally with said vertical strut, about mid-length thereof. The propeller and related parts, such as bearings, are mounted to the trailing end of the generally cylindrical housing. The trailing end of the housing is open and cylindrical in configuration, and internal screw threads are formed therein, together with a plurality of circular cavitation grooves. More particularly, the cavitation grooves are formed in the trailing end of the housing, and the screw threads are formed adjacent said grooves, on the leading side thereof. A propeller housing having external screw threads formed thereon screw-threadedly engages the internal screw threads of the generally cylindrical housing when the lower unit is fully assembled. The cavitation grooves are not engaged.

The leading part of the generally cylindrical housing is tapered downwardly, i.e., its diameter decreases in a trailing-to-leading direction, and the leading end of said housing is closed.

The screw threads formed in the trailing end of the cylindrical housing eventually become worn because of the deleterious environment within which the lower units are used. Due to the monolithic nature of the lower unit, and due to the absence of any obvious way to repair the worn threads, the conventional practice is to discard the entire lower unit when said threads are worn. A new lower unit must then be purchased by the boat owner. Thus, lower unit worn threads represent a rather catastrophic expense to the boat owner, but those of ordinary skill in this art have been unable to develop any repair techniques that would obviate the need to replace the unit in its entirety.

SUMMARY OF THE INVENTION

The present invention obviates the need to discard an entire lower unit when its screw threads become worn.

In the first step of the novel process, a predetermined trailing extent of the generally cylindrical housing within which worn internal threads are formed is separated from said generally cylindrical housing as a whole; a boring tool or other suitable instrument is employed. The cut is made forwardly, i.e., on the leading side of the trailing edge of the vertical strut with which the cylindrical housing is integrally formed so that the trailing edge of the downwardly tapered part of the cylindrical housing which remains after said trailing extent has been removed is recessed with respect to said vertical strut trailing edge.

In the second step, the leading edge of a cylindrical replacement part having internally formed circular cavitation grooves and internally formed screw threads pre-formed therein is welded or otherwise attached to the trailing end of the downwardly tapered remaining part of the cylindrical housing.

A novel alignment tool is employed to maintain the replacement part in proper alignment with the downwardly tapered part of the housing during the attachment process; the leading end of the alignment tool is tapered downwardly to conform to the configuration of said downwardly tapered part.

A screw thread-chasing tool is then used; it cleans the screw threads in the replacement part and re-aligns said threads because they may become somewhat warped during the welding procedure.

The replacement part and the housing to which it is secured are then line bored so that they will accept a mating part, i.e., a bearing carrier. A special thread cutting tap is run through the existing threads of the attached ring which may have warped during the welding operation. Excess weld is ground off and the unit is painted; this completes the repair procedure.

In this way, the cost of repair is substantially reduced, and the waste associated with the discarding of lower units is ended.

Thus it is seen that an important object of this invention is to advance the art of lower unit repair.

A more specific object is to provide a repair method that is easy to perform, yet which is highly effective.

Another object is to substantially reduce the cost to consumers of lower unit repair jobs.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective view of a lower unit, showing cavitation grooves and worn threads formed in the trailing end of a cylindrical housing;

FIG. 2 is an exploded perspective view of the lower unit after the trailing end of the cylindrical housing has been cut off, the replacement part, and the alignment tool;

DETAILED DESCRIPTION OF THE PREFERRED EMBODIMENT

Figure 4:
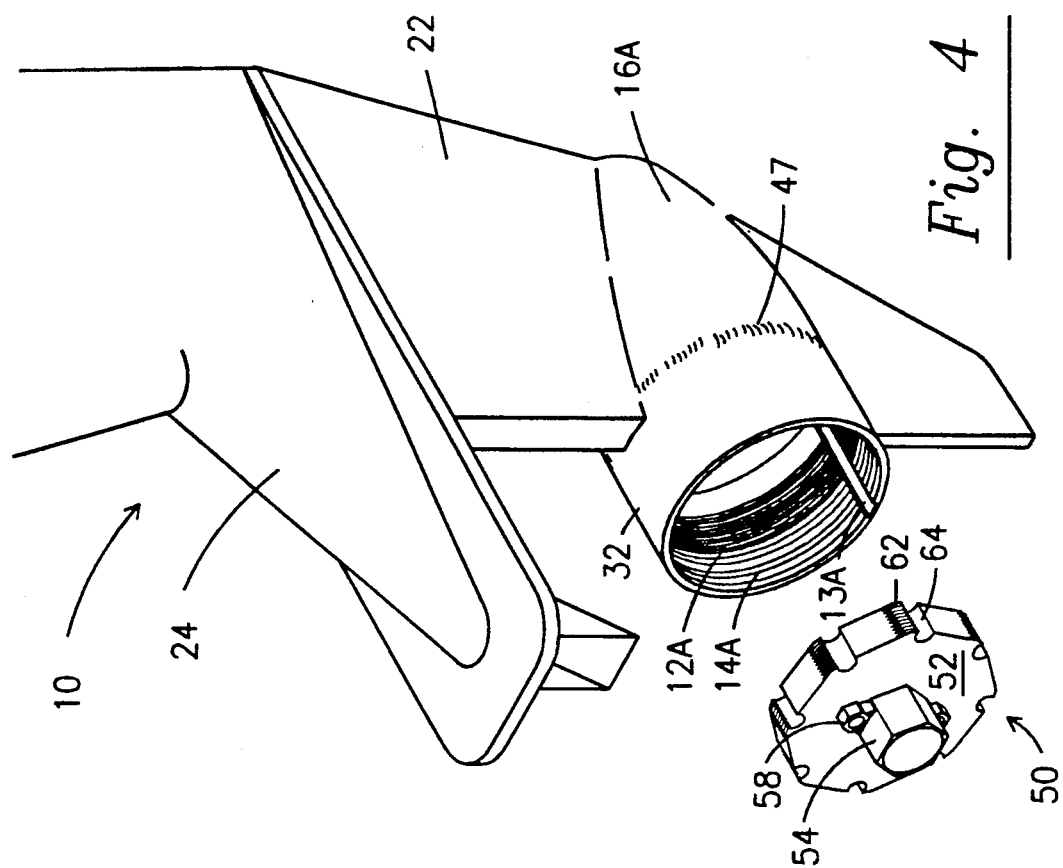
FIG. 4 is an exploded perspective view showing the tool employed to chase screw threads in the replacement part after completion of step shown in FIG. 3.

Referring now to FIG. 1, it will there be seen that a lower unit having worn screw threads is denoted as a whole by the reference numeral 10. The worn screw threads are generally denoted 12 and the circular cavitation grooves are denoted 14 as a whole. Note that the screw threads 12 are on the leading side of grooves 14. The screw threads 12 and grooves 14 are formed within a generally cylindrical housing 16 having an open, cylindrical trailing end 18 and a closed leading end 20. Keyway 13 receives a key formed on a bearing carrier, not shown.

Lower unit 10 further includes vertical strut 22 that depends from the upper part 24 of the lower unit, and a skeg 26. Vertical part 22 and skeg 26 have a trailing edge that is collectively denoted 28 because vertical strut 22, housing 16, and skeg 26 are integrally formed with one another; thus trailing edges 28, 28 are best thought of as a single trailing edge 28.

The dotted line 30 in FIG. 1 indicates where the trailing end of housing 16 is cut off from the leading end thereof; this cutting off step divides housing 16 into parts 16A and 16B and is the first step of the novel method. The cut-off trailing end 16B is delivered to a scrap metal recycling station, and is the only part of lower unit 10 that requires such re-cycling. Heretofore, as aforesaid, the entire lower unit 10 was re-cycled or discarded. Importantly, the cut is made forwardly of, i.e., on the leading side of trailing edge 28, as is clear from FIGS. 1 and 2; note in FIG. 2 that the circular trailing edge 18A of downwardly tapered remainder housing 16A is now recessed by a predetermined amount relative to said trailing edge 28. Note also that the downwardly tapered remaining part 16A of housing 16 has no screw threads 12 or grooves 14 formed therein.

In FIG. 2, the removed part 16B, which is cylindrical in configuration, is replaced with a new part denoted 32. Significantly, replacement part 32 is also cylindrical and has screw threads 12A and cavitation grooves 14A pre-formed therein.

FIG. 2 also shows a novel alignment tool 34 having a downwardly tapered leading end 36, an untapered, i.e., uniform diameter middle part 38, and an untapered trailing end 40. The downward taper of part 36 corresponds to the downward taper of remainder housing 16A; moreover, the outside diameter of said part 36 is slightly less than the inside diameter of housing 16A so that part 36 is slideably received within said housing 16A. Similarly, the inside diameter of replacement part 32 is slightly greater than the outside diameter of cylindrical part 38 of tool 34 so that said part 38 is slideably received within replacement part 32 when said alignment tool 34 is used in the manner hereinafter described. Finally, the outside diameter of trailing part 40 of tool 34 is greater than the inside diameter of replacement part 32 so that said trailing part 40 may not enter into the interior of said part 32.

Figure 3:
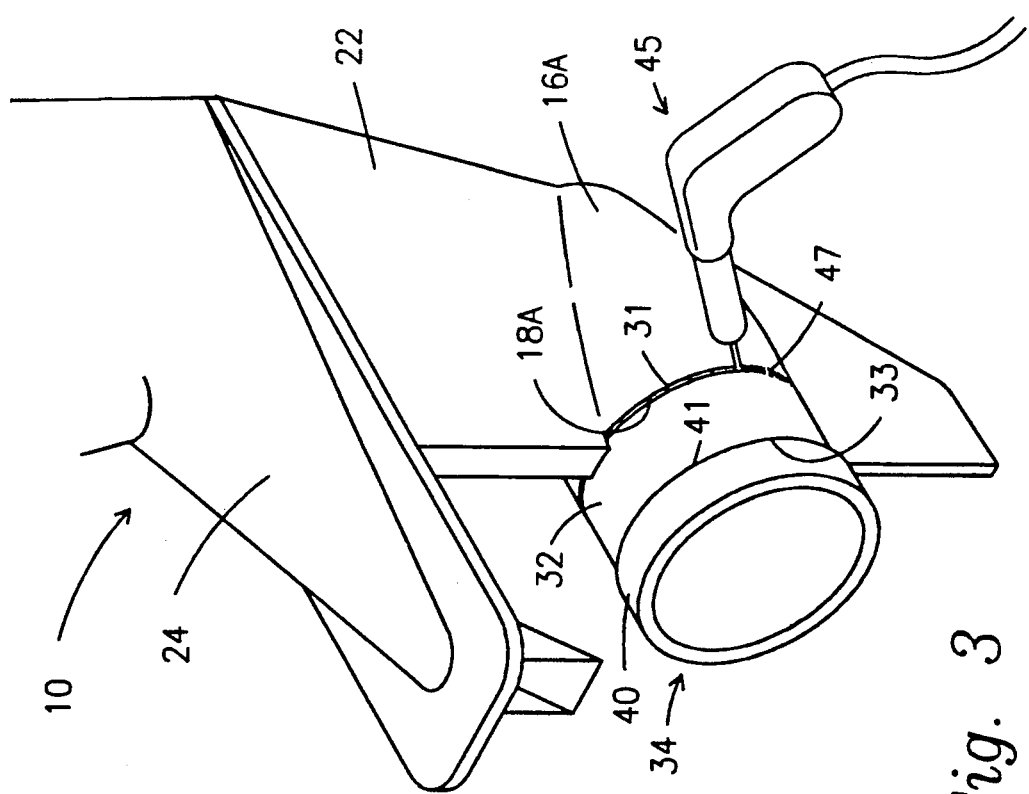
FIG. 3 is a perspective view showing the welding of the replacement part onto the lower housing, and showing the alignment tool being used to maintain the proper positioning of the replacement part throughout the attachment procedure.

Proper use of alignment tool 34 is depicted in FIG. 3. The leading edge 31 of replacement part 32 is positioned in abutting relation to the circular trailing edge 18A of remainder housing 16A, in axial alignment therewith as perhaps best depicted in FIG. 2. Tapered part 36 of alignment tool 34 is introduced sequentially through the cylindrical bore of replacement part 32, and the tapered hollow interior of remainder part 16A. The downward taper of leading part 36 corresponds to the downward taper of said remainder housing 16A, as aforesaid. Cylindrical part 38 of the tool is then slidingly inserted into the cylindrical bore of replacement part 32, and trailing part 40 of tool 34 is displaced in a trailing to leading direction as indicated by the directional arrow 43 in FIG. 2 until the leading edge 41 of part 40 abuttingly engages the trailing edge 33 of replacement part 32. That position is depicted in FIG. 3.

It should now be appreciated that the mating of part 36 of alignment tool 34 within remainder housing 16A, and the sandwiching of replacement part 32 between the trailing edge 18A of remainder housing 16A and the leading end 41 of tool 34 serves to hold replacement part 32 in precise alignment with housing remainder 16A. A tig welder 45, or other suitable means for joining parts 32 and 16A, is employed as depicted in FIG. 3 when tool 34 has been properly positioned. Said tool 34 thus also serves to maintain the proper relative positioning between parts 16A and 32 throughout the duration of the welding process; this ensures that the final alignment of parts 16A and 32 will be the same as the alignment between said parts as if they were integrally formed with one another. However, screw threads 12A may become slightly warped during the welding procedure.

After the joining process has been completed, alignment tool 34 is withdrawn. The appearance of welded-together parts 16A and 32 appears in FIG. 4; note screw threads 12A and cavitation grooves 14A formed in replacement part 32. Thus the assembly of FIG. 4 differs from that of FIG. 1 only because of weld line 47.

A novel thread cutter tool is then used to clean and re-align the pre-formed screw threads in the replacement part because said screw threads may have become warped during the welding procedure.

The bearing carrier is then installed; due to the aforesaid warping, a suitable tool is used to line bore said bearing carrier and remainder housing 16A.

Figure 8:
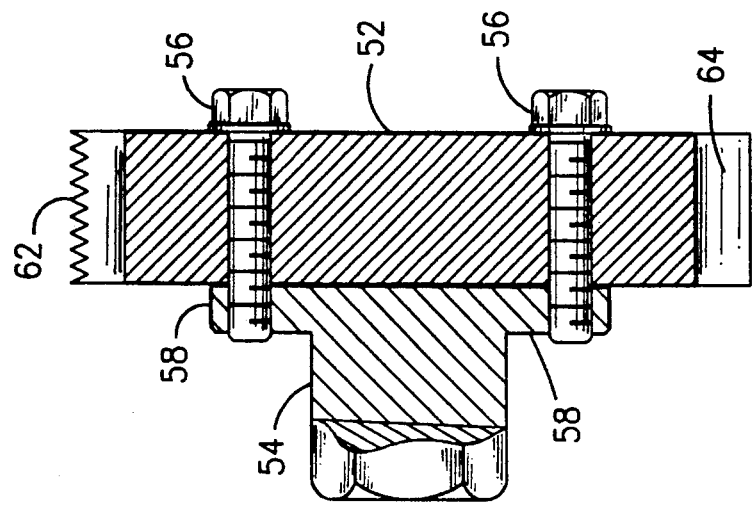
FIG. 8 is a sectional view of said novel tool.
Figure 7:
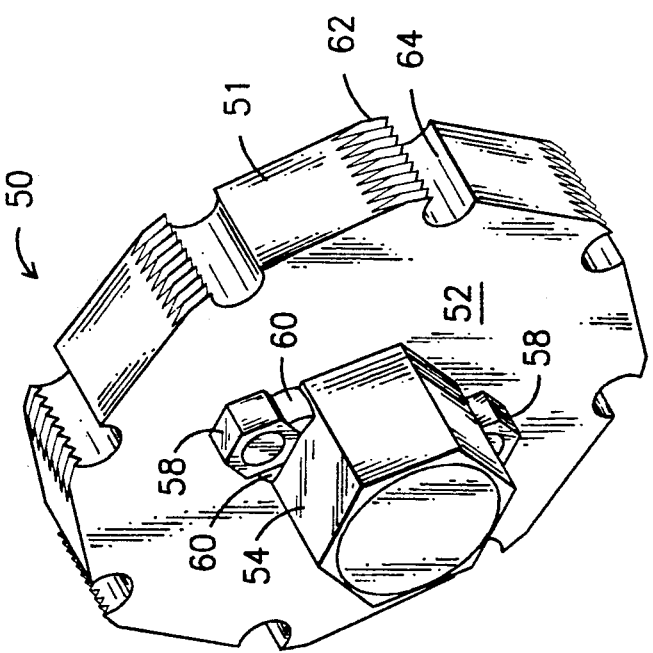
FIG. 7 is a perspective view of the novel tool shown in FIGS. 4 and 5.

The device for performing the thread cutting step is denoted 50 as a whole in FIG. 4; its structure, however, is best depicted in FIGS. 7 and 8.

Thread-cutting tool 50 includes a disc-shaped base 52 and a tool-engageable head 54. Head 54 is secured to base 52 by bolts 56, 56 having nuts 58, 58. Blocks 60, 60, of which there are four, are welded to base 52 and prevent rotation of nuts 58, 58 and ensure that rotation of tool-engageable head 54 results in simultaneous and corresponding rotation of base 52. A plurality of equidistantly and circumferentially spaced sets of very strong and sharp cutting teeth 62 are formed in the perimeter of base 52. A flat 51 is formed in trailing relation to each set of teeth. Each set of teeth 62 is contiguous to a channel 64 so that the leading edges of said teeth are fully exposed. Channels 64 are equidistantly and circumferentially spaced about the perimeter of base 52 as shown, and the longitudinal axis of each channel 64 is parallel to the rotational axis of thread-forming tool 50.

Figure 5:
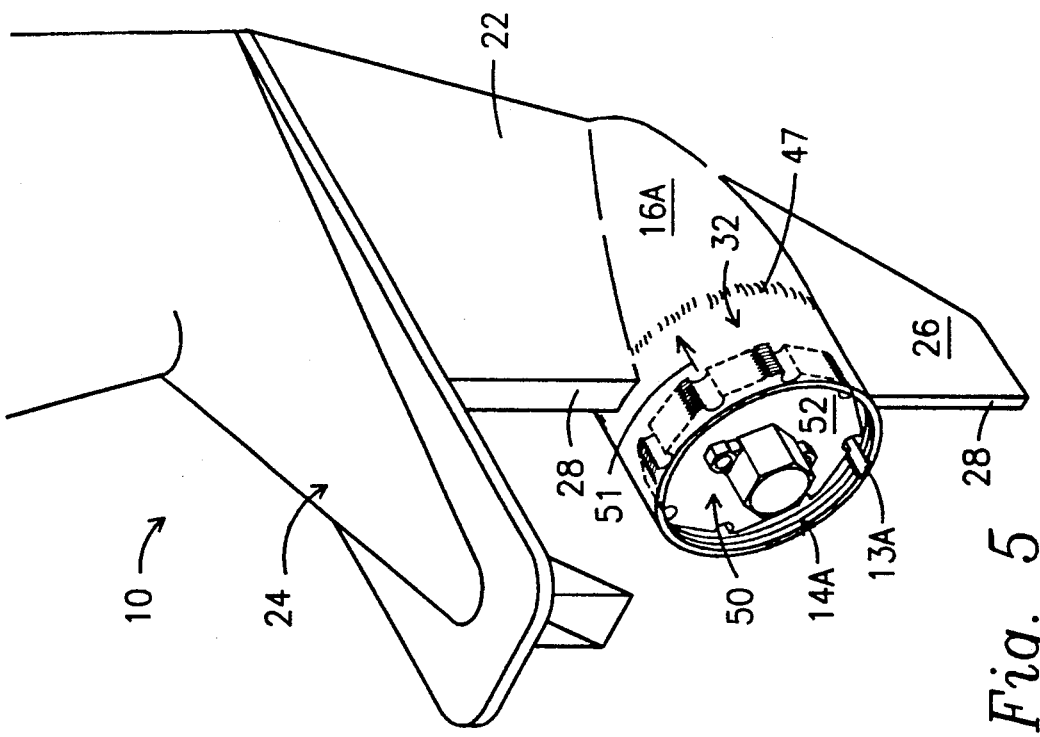
FIG. 5 is a perspective view showing the tool of FIG. 4 in its operable position.

As depicted in FIG. 5, tool 50 has an outside diameter slightly smaller than the inside diameter of replacement part 32 so that said tool 50 may be slideably received therewithin. Base 52 of tool 50 cannot advance further into replacement part 32 unless it is rotated so that its teeth 62 may cut thereinto. Its point of furthest insertion in the absence of teeth-aided advancement is depicted in FIG. 5. Once advanced to said extent, a suitable tool for rotating tool-engageable head 54 and hence base 52 is engaged to said head 54 and rotation of tool 50 begins. Said rotation chases screw threads 12 as cutting tool 50 advances in the direction indicated by directional arrow 51. When the thread cutting and cleaning is finished, tool 50 is retracted and a boring head or other suitable tool is used to line bore mated parts. The weld fillet is then ground smooth and the unit is painted. This is the final step in the repair process.

Figure 6:
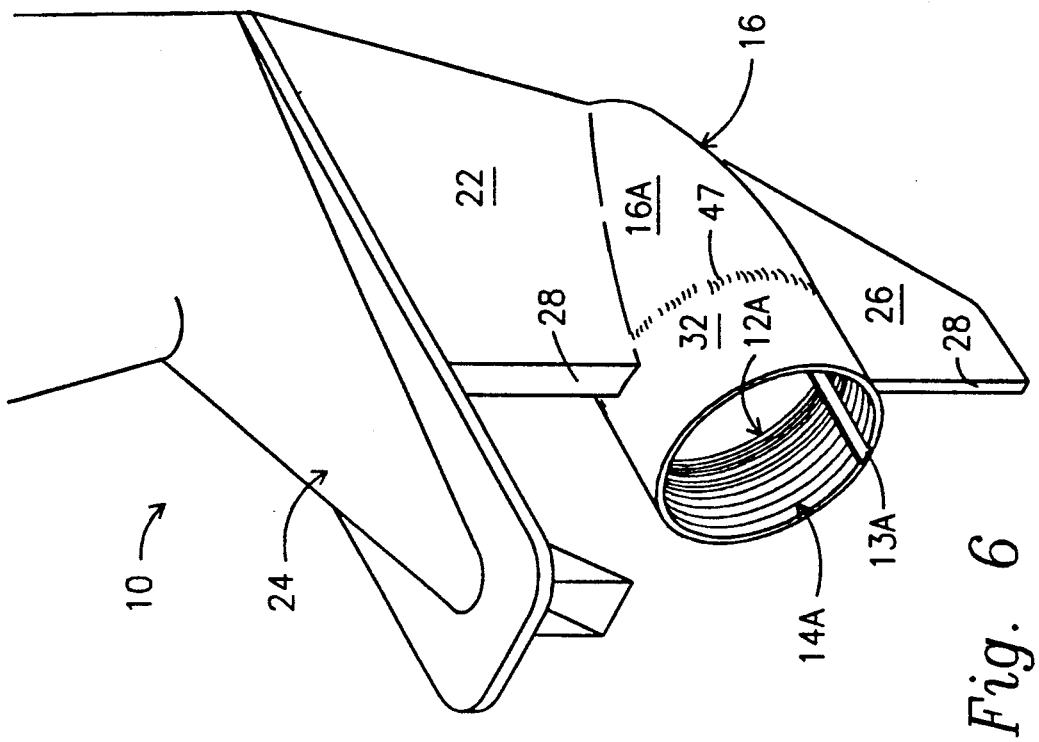
FIG. 6 is a perspective view of the repaired lower unit.

The fully repaired lower unit is depicted in FIG. 6.

This invention is clearly new and useful. Moreover, it was not obvious to those of ordinary skill in this art at the time it was made, in view of the prior art considered as a whole.

It will thus be sen that the objects set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A combination of parts for repairing a motorboat lower unit having worn screw threads, comprising:
   cutting means for removing a predetermined length of a cylindrical trailing end of a lower unit housing, said lower unit housing tapering downwardly from said cylindrical trailing end to a closed leading end and said cylindrical trailing end having a plurality of circular cavitation grooves and worn screw threads formed therein;
   a cylindrical replacement part having a predetermined length and having a plurality of circular cavitation grooves and screw threads preformed therein, said predetermined length of said cylindrical replacement part being equal to the predetermined length of said cylindrical trailing end of said lower unit housing that is removed;
   an alignment tool for aligning said cylindrical replacement part relative to said lower unit housing;
   attachment means for securing said cylindrical replacement part to said lower unit housing; and
   said alignment tool having a leading end that tapers downwardly so that it is ensleevable within said lower unit housing, a uniform diameter central part having a length substantially equal to the predetermined length of said cylindrical replacement part so that it is ensleevable within said cylindrical replacement part, and a trailing part having a diameter greater than a diameter of said uniform diameter central part so that it abuts a trailing edge of said cylindrical replacement part and retains it against movement when said attachment means is used to attach said replacement part to said lower unit housing.

2. The combination of claim 1, further comprising a thread-cutting tool for recutting and cleaning screw threads within said replacement part after said replacement part has been secured to said leading end of said lower unit housing.

3. The combination of claim 2, wherein said thread-cutting tool includes a disc-shaped base, a tool-engageable head secured to said base so that rotation of said tool-engageable head imparts simultaneous and corresponding rotation to said base, a plurality of sets of teeth formed in an outer perimeter of said thread-cutting tool, said sets of teeth being equidistantly and circumferentially spaced about the perimeter of said thread-cutting tool, a flat formed in trailing relation to each set of teeth, and a plurality of equidistantly and circumferentially spaced channels formed in said perimeter, there being a channel at each leading edge of each of said sets of teeth to fully expose the respective leading edges of said sets of teeth, said channels being disposed parallel to a rotational axis of said thread-cutting tool.

* * * * *